United States Patent [19]

Krueger et al.

[11] 4,136,932
[45] Jan. 30, 1979

[54] COMPOUND INDICATOR DEVICE CONTAINING AT LEAST ONE LIQUID CRYSTAL CELL

[75] Inventors: Hans Krueger; Wolfgang Welsch, both of Munich, Germany

[73] Assignee: Siemens Aktiengesellschaft, Berlin & Munich, Germany

[21] Appl. No.: 798,149

[22] Filed: May 18, 1977

Related U.S. Application Data

[62] Division of Ser. No. 545,107, Jan. 29, 1975, Pat. No. 4,054,678.

[30] Foreign Application Priority Data

Dec. 16, 1974 [DE] Fed. Rep. of Germany ....... 2459488

[51] Int. Cl.² ................................................ G02F 1/13
[52] U.S. Cl. .................................. 350/335; 350/336; 350/339
[58] Field of Search .................. 350/160 LC; 340/336

[56] References Cited

U.S. PATENT DOCUMENTS

| 3,820,875 | 6/1974 | Bohmer | 350/160 LC |
| 3,903,519 | 9/1975 | Zega | 350/160 LC X |
| 3,938,134 | 2/1976 | Hackstein | 350/160 LC X |

*Primary Examiner*—Paul A. Sacher
*Assistant Examiner*—R. Hille
*Attorney, Agent, or Firm*—Hill, Gross, Simpson, Van Santen, Steadman, Chiara & Simpson

[57] ABSTRACT

An indicator device which has two sealed chambers which are formed by at least one carrier member interposed between a pair of glass plate members to provide a tandem arrangement in the direction of travel of light in the device, characterized by at least one of the chambers containing a liquid crystal layer and being provided with transparent conductive material on the walls thereof to form a liquid crystal cell. In one embodiment, each conductive layer of each cell is separated in two parts by a continuous interruption in the layer so by selectively applying voltage to different parts, at least four different symbols or shapes can be indicated. In a second embodiment, the conductive layers of each cell are arranged as a segment electrode pattern with the segment being subdivided into partial segments with one partial segment being in one cell and the remaining partial segment in the second cell to enable determining errors in actuation of various segments during an indication. In a third embodiment, the liquid crystal cells are arranged in tandem one behind the other so that either by separately actuating the electrodes of each cell a sign or symbol can be produced without undesirable cross points or by sequentially activating the electrodes of each cell, a partial image can be produced in each cell to create a moving image on the device. In the fourth embodiment, one of the cells is provided with a reflective layer by either depositing from a silver-ammonium complex or by printing with a silver compound onto a surface of the chamber to provide a reflecting chamber which enables operation of the remaining cells in a reflective mode.

8 Claims, 6 Drawing Figures

COMPOUND INDICATOR DEVICE CONTAINING AT LEAST ONE LIQUID CRYSTAL CELL

This is a division of application Ser. No. 545,107, filed Jan. 29, 1975 now U.S. Pat. No. 4,054,678.

BACKGROUND OF THE INVENTION

1. Field of the Invention

The present invention is directed to an indicating device having at least two sealed chambers arranged in tandem directly behind one another in either the direction of travel of light in the device or the direction of viewing with adjacent chambers being separated by thin carrier members with at least one of the chambers being filled with a liquid crystal layer to form a liquid crystal cell which cooperates with the other chamber to provide indications. In several embodiments, different types of liquid crystal cells are used such as a polarizing cell is combined with a rotation cell to enable multi-color indication. In other embodiments, the electrode patterns of each of the cell are arranged to enable either selective indication of fixed symbols by separately actuating one cell or by actuating electrodes in both cells to give a complete indication.

2. Prior Art

Indicating screens or devices utilizing liquid crystals have many applications. For example, a liquid crystal cell formed by a layer of liquid crystal material disposed between two plates with each of the plates having a pattern of electrodes have been suggested. The electrodes on one plate are parallel strips and the electrodes on the other plate are parallel strips extending at 90° to the strips on the first plate to form an electrode matrix for applying a field to discrete areas of the liquid crystal cell. When producing a sign pattern with such an indicating screen, problems occur with this type of matrix since undesired cross points of the stips of the matrix will be energized to energize undesired portions of the cell while attempting to energize the desired portions of the configuration of the sign. To overcome these disadvantages, prior art devices have energized the various strips of the electrode matrix in a time sequence utilizing the storage capability of the layer which is dependent on the relaxation time of the liquid crystal after the electrical field is removed to give a complete picture from a series of energized areas.

The storage characteristics of the liquid crystal due to the relaxation time of the crystal to re-assume its condition when no electric field or potential is applied has prevented the use of liquid crystal cells to produce animated displays in which portions of images are moving and particularly, a moving image display in which portions of the moving parts overlap the preceeding image.

Instead of using a matrix of parellel strips with the strips on one surface of the layer extending perpendicular to the strips on the other surface, it has been suggested to provide indications of numbers by utilizing segmented electrodes which are separately energized in distinct patterns to form or indicate various numerals. While such an indicator screen has many applications, it cannot be used in certain applications, for example, the field of railroad signaling techniques or for scale. This is due to a lack of redundance of the indication of the sign. For example, to determine if a correct pull or weight has been indicated, it is impossible to detect the current being applied to individual segments of the liquid crystal cell since the current is so small and is strongly dispersed. Thus, there is no way of determining whether the proper segments are being energized.

In addition to display screens utilizing either an electrode matrix or segmented electrodes, display screens have been suggested which enable presenting either a colored indication on a light or white background or a light or white indication on a colored background. Such a device is discussed in an article by George H. Heilmeier, Joseph A. Castellano and Lewis A. Zanoni entitled "Guest-Host Interactions in Nematic Liquid Crystals", *Molecular Crystals and Liquid Crystals,* Volume 8, 1969, pages 293-304. This article discusses mixing a pleochroicdye such as a dichroic dye in a nematic liquid crystal layer to form a liquid crystal cell. When light which has been polarized strikes the cell or passes through the cell, the dye molecule if aligned in the direction of polarization will absorb light and exhibit a characteristic color of the particular dye. However, if the orientation of the dye molecule, i.e. their long axis, extends perpendicular to the direction of the electric vector of the polarized light, the light is transmitted through the cell unchanged. The article discusses applying a field to the liquid crystal layer to change the orientation of the layer and dye molecules to change the color of the light passed by the cell.

Liquid crystal cells can be of different types. One type of liquid crystal cell has a liquid crystal material which is a nematic material with a positive electric anisotropy and is a so-called rotational cell (TN). Another type of cell has a nematic material with a negative electric anisotropy and has a homeotropic orientation and is sometimes referred to as a DAP cell with DAP referring to the deformation of aligned phases.

It is suggested in an article by Susumu Sato and Masanobu Wada entitled "Liquid-Crystal Color Display By DAP-TN-Double-Layered Structure" *IEEE Transactions on Electron Devices,* May 1974, pages 312 and 313 to place a rotational cell (TC cell) and a separate DAP cell between a pair of cross polarizers. The DAP cell will transmit only one color tone from a white light passing through the arrangement. However, as pointed out by this article, an application of an electric field on the TN cells changes the direction of polarization of the light passing through the DAP cell to produce a different color. However, the arrangement as suggested in this article requires two complete individual cells which have high production cost and the device may suffer from parallax faults.

Another utilization of a liquid crystal indication screen is proposed in an article by Ian A. Shanks entitled "Liquid Crystal Materials and Device Developments" *Electronic Engineering,* August 1974, pages 30-37. In the article, a multi-colored presentation is suggested and achieved by placing two cells in tandem with a composite birefringent layer between the cells. This arrangement is placed between two polarizers which are either cross polarizers or parallel polarizers. Each of the cells is a rotational cell which will rotate the direction of polarization with the amount of rotation of the two cells being different, for example $\pi/2$ radian and $\pi/4$ radian. As disclosed in the article, by selectively actuating the two cells, four different colors can be achieved. It is suggested that the cell could be utilized with a cathode ray tube to convert a black and white picture into a colored picture image. In the device disclosed, the construction has three comparative thick layers between the two liquid crystal layers which may cause problems with parallax and the device is expensive to produce.

In a copending application of Helmut Katz, entitled "A Compound Liquid Crystal Indicator Screen" U.S. Ser. No. 545,108, filed Jan. 29, 1975, which issued as U.S. Pat. No. 3,992,082, a compound liquid crystal indicator screen having two liquid crystal cells arranged in tandem directly behind one another in the direction of travel of light through the device was proposed. This device included a stack of spaced members sealed together at their margin by glass solder with the stack including a pair of outer glass plate members with at least one transparent, very thin carrier member interposed therebetween to form the spaced chambers, which receive the liquid crystal layers and are separated from adjacent chambers by a carrier member. The construction of this device provides a compound liquid crystal indicator device which was substantially free of parallax.

SUMMARY OF THE INVENTION

The present invention is directed to an indicator device having at least two sealed chambers arranged in tandem directly behind one another in a direction of travel of light in the device or the direction of viewing, said device including a stack of spaced members sealed together at their margins by glass solder, said stack including a pair of outer glass plate members with a least one transparent, this carrier member interposed therebetween to form the spaced chambers with adjacent chambers being separated by a carrier member, at least one of the chambers containing a liquid crystal layer and having a transparent conductive material on the surfaces of the members facing the layer to form a liquid crystal cell with the improvements to overcome some of the problems mentioned hereinabove with the prior art devices. In one embodiment of the invention, each of the chambers contains a liquid crystal layer with the surfaces of the members facing each chamber being transparent conducting material with the material of the surface of at least one chamber being configured to impose electrical field on selected portions or areas of the liquid crystal layer, the liquid crystal layer of one of said chambers being nematic material having a positive dielectric anisotropy and a homogeneous orientation with the molecules of the layer being twisted in a directed perpendicular to the plane of the surface of the chamber to form a rotation cell, the liquid crystal layer in one of the other cells being a nematic material with a negative dielectric anisotropy and a homeotropic orientation to form a DAP cell, the device includes a pair of polarizers with the polarizers disposed adjacent each plate member in the direction of travel of light through the device so that by electrically applying separate electrical fields on the rotation cell and the DAP cell both independently and simultaneously produces multi-color indications. This device is free from parallax faults and can be produced very economically.

A second embodiment uses the indicator device having at least two chambers with each of the chambers containing a liquid crystal layer and with the surfaces of the members facing each chamber having transparent conductive material with the material on the surface of at least one chamber being configured to impose electrical field on the selected portions or areas of the liquid crystal layer, the liquid crystal layer in one of said chambers being of the type to produce a rotational cell, the liquid crystal layer in at least one of the other cells being a nematic, homogeneously oriented material with a positive dielectric anisotropy and containing at least one pleochroic dye mixed therein to form a polarizing cell, a polarizer is adjacent the plate members which is separated from the polarizing cell by the rotation cell so that selective application of separate electrical fields on the rotation cell and the polarizing cell both independently and simultaneously produces a multi-color indication on a multi-color background. This embodiment provides a device that has an extremely compact construction and which is easy and inexpensive to manufacture.

A third embodiment of the present invention which may be used in conjunction with a cathode ray tube to give a color presentation is substantially free from parallax faults and can be constructed inexpensively. In this embodiment, a device having at least two sealed chambers in tandem is utilized and two of the chambers contain a liquid crystal layer which layer is a nematic material having a positive dielectric anisotropy and a homogeneous orientation with the molecules of the layer being twisted in a direction perpendicular to the plane of the surface to form a pair of rotational cells with the angle of rotation of the pair of cells being different. The carrier member between the pair of cells is a birefringent layer, preferably mica, and the device includes a pair of polarizers with the polarizers disposed adjacent each plate member in a direction of travel of light through the device so that selected application of separate electrical fields to the two rotation cells both simultaneously and independently produces at least four different colors.

A fourth embodiment of the invention utilizes a device having tandem chambers with each of the chambers containing a liquid crystal layer and the surfaces of the members facing each chamber having transparent conductive material with the material on each surface having interruption in the form of a fine continuous line outlining a symbol and electrically separating the symbol from the remaining portion of the material, each of the symbols and remaining portions having separate electrical leads so that an electrical potential can be selectively applied to each symbol which is different than the potential applied to the remaining symbols and portions to selectively produce at least four separate and distinct symbol indications.

A fifth embodiment of the present invention overcomes problems which occur when attempting to place an indication on a liquid crystal display device having a matrix of electrodes comprising a plurality of strips on one surface extending perpendicular to the parallel strips on the other surface of the cell. To accomplish this, the embodiment uses a device having at least two chambers arranged in tandem with each chamber containing a liquid crystal layer, the surface of the members facing each chamber having the transparent conductive material, with the material of each surface being in the form of a plurality of parallel strips, the strips of the two surfaces facing each layer extending perpendicularly to each other to form a matrix for the liquid crystal layer, the liquid crystal layer in each of the said chambers being a nematic material having characteristics to form a rotational cell with the angle of rotation being 45°. The rotation cells arranged so that the compound angle of rotation of both cells is 90° and the device includes a pair of polarizers with the polarizers disposed adjacent each plate member in a direction of travel of light through the device so that the indication can be presented by selectively applying separate electrical fields on portions of each cell both simultaneously and independently.

A sixth embodiment overcomes the difficulty of relaxation rate or storage capacity of a liquid crystal layer of a single cell operation by utilizing a device having at least two tandemly arranged chambers with each chamber containing a liquid crystal layer and the surfaces of the members of each chamber having a conductive material with the material on the surfaces being configured to improse electrical field on selected portions or areas of the liquid crystal layer so that by applying an electrical field to selected portions of the conductive material of each chamber or cell in a timely succession, successive partial images may be produced by each cell to give a moving image indication on the device.

A seventh embodiment of the present invention enables indicating a symbol or sign on an indicating device which if indicated on a device having a single liquid crystal cell would have undesirable cross points energized on the matrix of electrodes. To accomplish this, the embodiment utilizes indicating device having a plurality of tandemly arranged chambers with each chamber containing a liquid crystal layer, the surfaces of the members of each chamber having a transparent conductive coating material with the material of each surface being in a form of a plurality of parallel, spaced strips with the strips on the two surfaces facing each layer extending perpendicular to each other to form a matrix for the liquid crystal layer so that selectively applying a potential to selected strips in each chamber both simultaneously and independently produces in each cell a partial image of a symbol being indicated which symbol would have undesirable cross points, if presented on a single liquid crystal cell.

An eighth embodiment of the present invention enables the provision of a redundant indication which can be used in railroad signaling and scales. To accomplish this task, the embodiment utilizes a device having at least two chambers arranged in a tandem directly behind one another in the direction of travel of the light in the device with each chamber containing a liquid crystal layer and the surfaces of the members facing each layer having transparent conducting material with the conducting material of each surface of the carrier member separating the two chambers being in a pattern, the pattern on one side of the carrier member having a plurality of first partial segments and the pattern on the opposite side of the carrier member having a plurality of second partial segments and are aligned with the first partial segments on the one side so that the first partial segments and second partial segments supplement each other to form a segmented pattern, each of said partial segments having a separate lead so that a redundant indication of a symbol on the segmented pattern is produced on the device by selectively applying a potential to the desired first and second partial segments.

A ninth embodiment of the present invention enables operating a liquid crystal cell in a reflective mode without problems of the reflective material interferring with the conductive layers. To accomplish this task, the embodiment utilizes a device having at least two sealed chambers arranged in a tandem directly behind one another in the direction of viewing of the device, at least one of the chambers contains a liquid crystal layer and has transparent conductive material on the surfaces of the members facing the layer to enable applying a potential to the selected portions of the layers, and a reflecting coating being disposed on at least one surface of the members facing one chamber to form a reflective chamber. The coating can be applied to both surfaces of the reflective chamber by being deposited from a silver-ammonia complex placed in the chamber and subsequently heated so that silver deposits on both surfaces of the reflective chamber. A single coating may be applied on the surface of the carrier member facing the reflective chamber and may have a configuration or pattern so that only a portion of the light entering the cell is reflected. The reflective coating of the reflective chamber may be applied by using an organic silver compound which is applied in a screen printing method to the surface such as the carrier member.

A tenth embodiment of the present invention enables the integration of a special lighting source in an electric crystal display. To accomplish this task, the device, which at least two sealed chambers arranged in tandem directly behind one another in the direction of viewing, has at least one chamber containing a liquid crystal layer with transparent conductive material on the surfaces of the chamber which material may be provided with a configuration to enable applying a field to selected portions of the liquid crystal layer, at least one chamber which is most remote from the direction of viewing contains an electro-chemical luminescence layer and is provided with transparent conductive material so that a voltage may be applied to the luminescence layer to create an even illuminated background in the device as the remaining liquid crystal cells are energized to produce indications. The device of this embodiment has the advantages of providing a compact structure which is inexpensive to manufacture and a device which is free from parallax.

DESCRIPTION OF THE PREFERRED EMBODIMENTS

Figure 1:
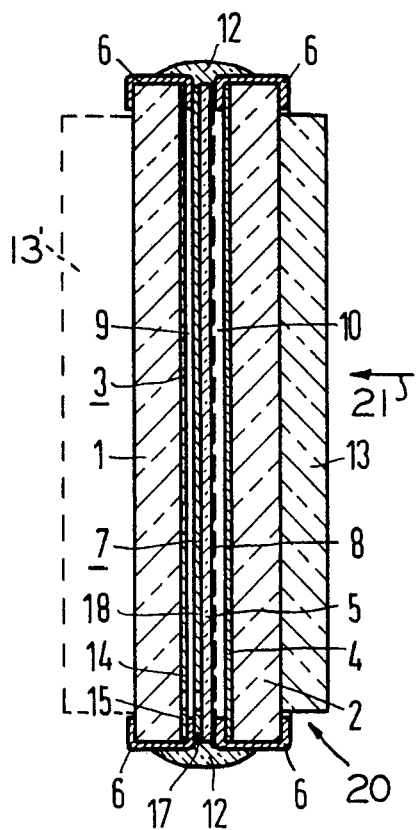
FIG. 1 is a cross section of an embodiment of a compound indicator device in accordance with the present invention.
Figure 2:
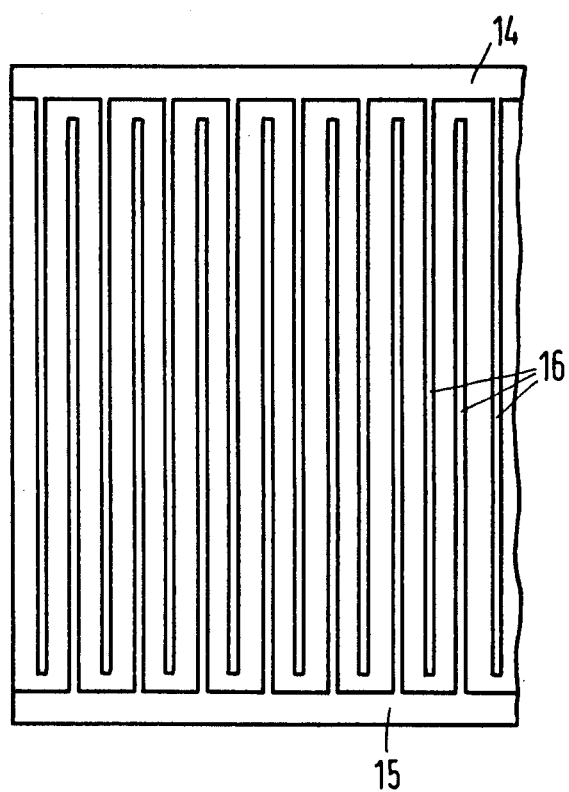
FIG. 2 is a partial plan view of a plate member illustrating an electrode pattern thereon.

The principles of the present invention are particularly useful when incorporated in an indicator device or screen generally indicated as 20 in FIG. 1 and which device has two cells arranged in tandem in a direction of light entering the cell or a direction of viewing which direction is indicated by an arrow 21.

As illustrated, the indicator screen or device 20 has a stack arrangement of members comprising outer glass plate members 1 and 2, each of which on a surface are provided with a transparent conductive layer or material 3 and 4, respectively. The members 1 and 2 are arranged with at least one very thin, transparent carrier member or foil 5 interposed therebetween with the electrode layers 3 and 4 facing the foil. The preferred thickness of this foil is 500 mm or less. To ensure the desired distance between the member 5, which may be either mica or glass, and each of the plate members 1 and 2, a plurality of U-shaped spacing or strip elements which have legs engaging opposite surfaces of each of the plate members 1 and 2 are mounted on the margins of the plate members. When the plate members 1 and 2 and the carrier member 5 are arranged in a stacked relation, the legs of the strip elements 6 ensure proper spacing between the surfaces of the carrier member and each of the facing surfaces of the plate members 1 and 2. The carrier member 5 is provided on each surface with transparent conductive material 7 and 8.

As assembled, the margins of the stacked members are sealed with a glass solder 12 to form sealed chambers 9 and 10. In forming the chambers, at least one opening is left to allow the introduction of the material into the chamber and the opening is sealed after introduction of the material in a conventional manner. Further details in constructing the device 20 are set forth in the above-mentioned copending patent application.

Depending on the particular function of the liquid crystal layer contained in either chamber 9 and 10, the conductive material material facing the layer will have a particular configuration. For example, the conductive material may be a continuous layer or may be configured to apply a field or potential to discrete areas or portions of the liquid crystal layer. One example of a configuration is a matrix electrode such as illustrated by the layers 4 and 8. In the matrix electrode, the layer 8 has a plurality of parallel spaced strips on the surface of member 5 and the layer or conductive material 4 are a plurality of spaced parallel strips which as illustrated extend perpendicular to the strips of the layer 8. By energizing a strip of each layer, a potential is applied in the area where the two strips cross.

In the embodiment illustrated in FIG. 1, the outer glass plate member 2 is provided with a polarizer 13 which will polarize light entering the cell. The chamber 10 is a rotation cell and contains a nematic material having a positive dielectric anisotropy and a homogeneous orientation with the molecules of the layers being twisted in a direction perpendicular to the plane of the surface of the chamber 10. This twist can be accomplished by treating the surfaces engaging the layer such as by wiping. The direction of wiping on one surface such as 4 being perpendicular to the direction of wiping on the other surface so that a twist of 90° is accomplished. When no current or field is applied to the liquid crystal layer in the chamber 10, light passing through the polarizer 13 will be polarized and the direction of polarization will be rotated 90° as the light passes through the rotation cell. In those areas in which current is applied, such as potential being placed on various strips of the conductive layers 4 and 8, the twist is destroyed and the direction of polarization of the light passing through those selected areas will be unaffected.

Chamber 9 contains a nematic homogeneous oriented liquid crystal layer of a positive dielectric anisotropy which contains a minor addition of a dichroic dye or color agent which assumes the orientation of the liquid crystal molecules to form a polarizing cell. The molecules of the dye will absorb certain light wave lengths from a polarized light when in the proper orientation and therefore pass light of a distinctive color depending on the particular dye. However, when the orientation is rotated 90°, the polarized light is passed uneffective and appears as white polarized light.

To change the direction of orientation of the molecules of the liquid crystal and the dye molecules carried therein, the conductive material 3 and 7 on the facing surfaces of the plate member 1 and the carrier member 5 are in the form of transverse field electrodes and produce an electrical field extending parallel to the surfaces of the members 1 and 5 and perpendicular to the direction of the homogeneous oriented material of the liquid crystal layer. To accomplish this, the conductive material of the layer 3 is provided with two mutually engaging combs 14 and 15 with each comb having strips or prongs 16 which extend between the prongs of the other comb. Thus adjacent prongs or strips can have a different potential applied by applying different potentials through leads (not illustrated) to the bases of the combs 14 and 15. In a similar manner, the conductive layer 7 is provided with combs 17 and 18. The direction of the individual combs or prongs 16 of the combs coincide with the orientation of the homogeneous directed liquid crystal layer. If different potentials are placed on individual comb feed lines, a transverse field would form between the adjacent comb strips and will rotate the direction of orientation of the liquid crystal layer approximately 90° in a plane parallel to the plane of the members.

Assuming that both the rotation cell and polarizing cell are de-energized and that the polarizer 13 polarizes light in a direction perpendicular to the direction of orientation of the layer of the polarizer cell 9, light passing through the device 20 will assume the color of the dye. Applying a potential on selected areas of the rotation cell will produce a white indication on the colored background. If the polarizing cell is energized, then the indication will be a colored indication on a whilte background. By adding a suitable coloring agent either in the rotation cell or by imposing it onto the light entering the device, it is possible to get an indication of one color on a background of a second color or vice versa depending on operation of the cell.

If the tandem arrangement with the polarizer cell is to be operated in reflection, a diffused mirror may advantageously be placed between the outer glass plate member 1 and the liquid crystal layer in the chamber 9. In this case, the electrodes of the polarizer would not be required.

The device 20 with certain modifications can be utilized to produce multi-color indications. To accomplish this, both the conductive coatings 3 and 7 are modified to provide a desired symbol or configuration to enable applying voltage to a local area of the liquid crystal layer contained in the cell 9. Such modifications can be a matrix electrode such as utilized in the chamber 10. The chamber 10 contains a positive nematic material to form a rotation cell as in the previously described embodiment. In the chamber 9, a liquid crystal layer of a nematic material with homeotropic orientation and a negative dielectric anisotropy is placed to form a DAP cell. The device 20 includes two polarizers 13 and 13' which is indicated in dash lines on the outer plates. The direction of polarization of the polarizers 13 and 13' can be either parallel to each other or perpendicular to each other. Since the energizing of a DAP cell causes transmission of one color which is dependent on whether the polarizers are cross polarizers or parallel polarizers, the actuation of the rotation cell enables switching the polarization orientation between crossed and parallel orientation. Actuation of a DAP cell enables producing a colored indication instead of passing white light. In the abovementioned arrangement, indications of different colors can be obtained. It should be noted that the device 20 is not limited to one DAP cell and one rotation cell respectively, and instead of being operated in transmission as illustrated, can be provided with a reflective coating to operate in a reflective mode.

If the device 20 has the polarizers 13 and 13' and both of its chambers 9 and 10 contain rotation cells which have an amount of rotation of a different angle, for example 90° and 45°, respectively, and if the carrier foil 5 is of a birefringent material such as mica at least four different colors can be created by selective operation of the cells. Such a device has been suggested as being used with a cathode ray tube such as a black and white picture tube and the control of the actuation of the conductive layers being connected to the color signal. If used in such a situation, the conductive layers would preferably be continuous across the surfaces of the members 1, 2 and 5. However, to produce indication various configured electrodes can be utilized such as the matrix type electrodes of the conductive layers 8 and 4.

Figure 3:
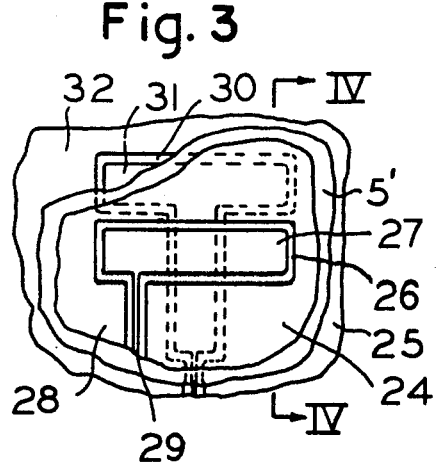
FIG. 3 is a partial plan view with portions broken away of a carrier member with an electrode pattern provided thereon.
Figure 4:
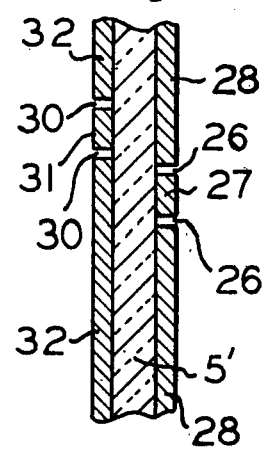
FIG. 4 is a cross-sectional view taken along lines IV—IV of FIG. 3.

Another embodiment of the device 20 enables indicating four or more symbols and uses a carrier member 5' illustrated in FIG. 3. The carrier member 5' has a continuous conductive layer 24 on one surface and a continuous conductive layer 25 on the opposite surface. The layer 24 is provided with an interruption 26 in the form of a continuous line which outlines a symbol 27 from a remaining portion 28 of the layer 24. The symbol 27 and the remaining portions 28 have separate leads and, as illustrated, the lead for the symbol 27 may be a thin lead 29 extending to a margin of the carrier member 5'. On the opposite surface of the carrier member 5', the conductive layer 25 has a similar interruption 30 which forms a symbol 31 which is separated by the interruption from a remaining portion 32. As best illustrated in FIG. 4, the continuous interruptions 26 and 30, electrically isolate and separate the symbols 27 and 31 from the respective remaining portions 28 and 32.

If each of the layers 3, 4, 7 and 8 is provided with symbols in this manner, the two cells could contain four superimposed symbols. During operation a potential is applied to a selected symbol and the remaining portion of the layer containing the selected symbol plus the remaining portions and symbols of the other layers are placed at zero potential or ground. Thus, only the portion of layer overlying the symbol having potential applied thereto is energized. If the liquid crystal layer is the type that creates dynamic dispersion when a field is applied thereto, a separate symbol can be indicated and it is noted that the device does not need the polarizers. While the device 20 only contains two chambers, additional chambers could be created by interposing more than one carrier member between the members 1 and 2. With each additional chamber, two additional symbols in accordance with this embodiment could be added to the device.

As mentioned above, when using a single liquid crystal cell having a matrix with parallel strips with the strips on opposite surfaces of the layer extending perpendicular to each other, problems occur when presenting an image containing a sign or symbol due to the fact that when one strip on one side of the layer is energized, a voltage will be applied on selected portions of the layer for each strip of the other side that is energized. In other words, at each cross point of the two energized strips, the layer will be energized. To present a sign such as a numeral 8, the strips that would be energized would produce a block instead of the numeral due to undesirable cross points being energized.

To overcome this problem an embodiment of the indicator 20 having polarizers 13 and 13' which may be either cross polarizers or parallel polarizers can be used. The device 20 has two chambers 9 and 10 filled with a liquid crystal layer which forms a rotation cell with each cell having an angle of rotation of 45° and being aligned so that the combined rotation of the two cells is 90°. The conductive layers of each of the chambers are formed to provide each cell with the matrix electrode pattern. The electrode pattern of the chamber 9 are decoupled from the electrode matrix of the chamber 10. Each cross point that is triggered in each cell will combine with the cross points in the other cell to form a compound image on the device 20.

If the polarizers 13 and 13' are cross polarizers, a triggered intersection in a cell will appear dark as compared with the bright background. Since a trigger area in one of the rotational cells only affects or decreases the rotation of the direction of polarization between the cross polarizers by 45°, the transmission ability of the area being energized is decreased only by a factor of a $Cos^2 45° = \frac{1}{2}$ as compared to the voltage free portions of the liquid crystal. Thus the brightness relation between the energized areas and the voltage free areas is 1:500 instead of 1:1000 which occurs in the normal field effect rotation cell. However, the advantages of being able to indicate signs without requiring time sequential operation of the matrix or with a less degree of time sequential operation, greatly out weighs the loss of contrast between the indication and the background.

Another embodiment of the present invention enables solution of the above problem by using liquid crystal layers which act in dynamic dispersion. In this embodiment, the polarizers are not required and the chambers 9 and 10 contain a layer which produces dynamic dispersion of light when energized. This embodiment accomplishes production of images particularly symbols or signs without energizing the strips that produce the undesirable cross points. For example, to indicate the numeral 8, the horizontal portions of the numeral would be applied to the matrix of one cell, and the vertical lines would be produced in the other cell. Thus the whole numeral could be placed on the device 20 in a single step.

In addition to enabling the production of images of signs or symbols, the above two embodiments enable producing moving images or animated displays. To accomplish this, the overlapping and moving portion are placed on separate cells of the tandem arrangement. Such separation of the partial images that are being moved eliminates the problems of the storage effect of the liquid crystal layer.

Figure 5:
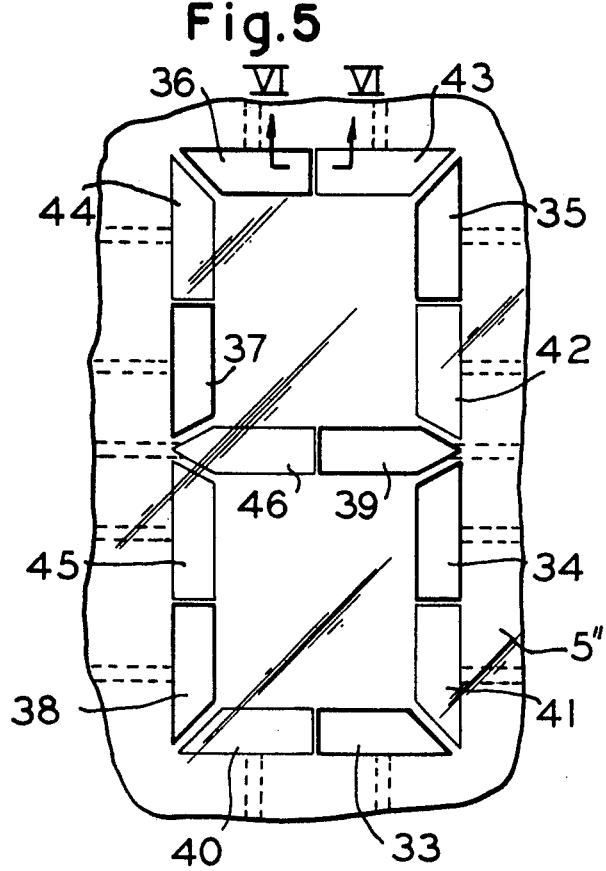
FIG. 5 is a partial plan view of a different electrode pattern in accordance with the present invention.
Figure 6:
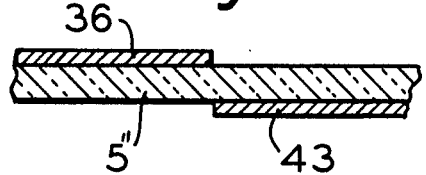
FIG. 6 is a cross-sectional view taken along lines VI—VI of FIG. 5.

As mentioned above, problems occur with utilizing liquid crystal displays in certain applications since they do not contain a redundant indication. An embodiment of the present invention utilizes special electrode configuration in the device such as 20. The layers 3 and 4 are continuous layers and the device uses a carrier member 5". As illustrated in FIGS. 5 and 6, the transparent carrier member 5" on an upper surface is provided with a plurality of first partial segments 33–38 and on the other surface is provided with second partial segments 40–46. The two groups of partial segments are arranged so that in the viewing direction they supplement each other to form a seven-segment electrode pattern.

During the operation of the device 20, various first and second partial segments necessary to complete the numeral are energized and produce partial images in the chambers 9 and 10 which supplement each other and provide a complete image of the numeral. If a fault in the device causes one of the partial segments to be erroneously energized, or to fail to energize, the failure of the device 20 will be readily apparent. Thus, the alignment of the first partial segments with the second partial segments to make a seven-segment electrode pattern provides the device with a redundance which is necessary in certain applications.

It is also possible to use the device with one chamber being a reflective chamber. To accomplish this, the chamber may be filled with a silver-ammonium complex and subsequently heated to cause the silver to be deposited on the surfaces of the chamber. In such utilization, the remaining chambers are filled with liquid crystals. It is also possible to coat only one surface of the reflective chamber, such as a surface on the carrier member 5, by a screen printing method using an organic silver compound. When printing the reflecting material or layer on the wall of the chamber, it may be provided with a particular configuration or pattern so that only portions of the light entering the cell are reflected.

The compound indicating device of the present invention has an embodiment in which one of the chambers such as 9 which is furthest from the viewer is filled with an electro-chemical luminescence layer. The remaining chambers such as 10 contain the liquid crystal layer. The luminescence layer will produce light when subjected to a voltage, as known in the art, and thus provides an even illuminated background for any image which is imposed on the remaining liquid crystal cells.

Although various minor modifications might be suggested by those versed in the art, it should be understood that we wish to employ within the scope of the patent granted hereon all such modifications as reasonably and properly come within the scope of our contribution to the art.

We claim:

1. In an indicator device having at least two sealed chambers arranged in tandem directly behind one another in the direction of travel of light in the device, said device including a stack of spaced members sealed together at their margins by glass solder, said stack including a pair of outer glass plate members with at least one transparent, thin carrier member interposed therebetween to form the spaced chambers with adjacent chambers being separated by a carrier member, at least one of the chambers containing a liquid crystal layer and having transparent conductive material on the surfaces of the members facing the layer to form a liquid crystal cell, the improvements comprising each of said chambers containing a liquid crystal layer, the surfaces of the members facing each chamber having a layer of transparent conducting material with the material on each surface having an interruption in the form of a fine continuous line outlining a symbol and electrically separating the symbol from the remaining portion of the material of the layer, each of said symbols and remaining portions having separate electrical leads so that an electrical potential can be selectively applied to each symbol which is different than the potential applied to the remaining symbols and portions to selectively produce at least four separate and distinct symbol indications.

2. In an indicator device having at least two sealed chambers arranged in tandem directly behind one another in the direction of travel of light in the device, said device including a stack of spaced members sealed together at their margins by glass solder, said stack including a pair of outer glass plate members with at least one transparent, thin carrier member interposed therebetween to form the spaced chambers with adjacent chambers being separated by a carrier member, at least one of the chambers containing a liquid crystal layer and having transparent conductive material on the surfaces of the members facing the layer to form a liquid crystal cell, the improvements comprising each of said chambers containing a liquid crystal layer, and the surfaces of the members facing each chamber having transparent conducting material with the material on the surfaces being configured to impose an electric field on selective portions of the liquid crystal layer therein, so that by applying an electric field to the selected portions of the conductive material of each cell in a timely succession, successive partial images may be produced by each cell to give a moving image indication on the device.

3. In an indicator device having at least two sealed chambers arranged in tandem directly behind one another in the direction of travel of light in the device, said device including a stack of spaced members sealed together at their margins by glass solder, said stack including a pair of outer glass plate members with at least one transparent, thin carrier member interposed therebetween to form the spaced chambers with adjacent chambers being separated by a carrier member, at least one of the chambers containing a liquid crystal layer and having transparent conductive material on the surfaces of the members facing the layer to form a liquid crystal cell, the improvements comprising each of said chambers containing a liquid crystal layer, the surfaces of the members facing each chamber having transparent conducting material, the conducting material on each surface of the carrier member separating two chambers being in a pattern, the pattern on one side having a plurality of first partial segments and the pattern on the opposite side having a plurality of second partial segments aligned with the pattern on the one side so that the first partial segments and second partial segments supplement each other to form complete segments of a segmented pattern, each of said partial segments having a separate lead so that a redundant indication is given on the device.

4. In an indicator device having at least two sealed chambers arranged in tandem directly behind one another in the direction of viewing of the device, said device including a stack of spaced members sealed together at their margins by glass solder, said stack including a pair of outer glass plate members with at least one transparent, thin carrier member interposed therebetween to form the spaced chambers with adjacent chambers being separated by a carrier member, at least one of the chambers containing a liquid crystal layer and having transparent conductive material on the surfaces of the members facing the layer to form a liquid crystal cell, the improvements comprising one of said chambers being a reflective chamber free of a liquid crystal layer, said reflective chamber having a reflecting coating being disposed on at least one surface of the members facing said reflective chamber so that each of the liquid crystal cells contained in the remaining chambers operates in a reflective mode.

5. In an indication device according to claim 4, wherein a reflecting coating is disposed on both surfaces of the reflective chamber by being deposited from a silver-ammonium complex.

6. In an indicator device according to claim 4, wherein the reflecting coating is disposed only on the surface of the carrier member facing the reflective chamber.

7. In an indicator device according to claim 4, wherein the reflecting coating is provided with a pattern to reflect only a portion of the light entering the device.

8. A method of providing a moving image indication on a device comprising the steps of providing an indicating device having at least two sealed chambers arranged in tandem directly behind one another in the direction of travel of light in the device, said device including a stack of spaced members sealed together at their margins by glass solder, said stack including a pair of outer glass plate members with at least one transparent, thin carrier member interposed therebetween to form the spaced chambers with adjacent chambers being separated by a carrier member, each of said chambers containing a liquid crystal layer, and the surfaces of the members facing each chamber having transparent conductive material with the material of the surfaces being configured to impose an electric field on selective portions of the liquid crystal layer therein, applying an electric field to the selected portions of the conductive material of each cell to create a partial image for each cell, and controlling the applying of the electric field to create said partial images in a timely succession to produce a moving image indication from said partial images.

* * * * *